(12) United States Patent
Godavarti et al.

(10) Patent No.: US 9,705,633 B2
(45) Date of Patent: Jul. 11, 2017

(54) SYSTEM AND METHOD FOR PACKET SCHEDULING

(71) Applicant: Nuance Communications, Inc., Burlington, MA (US)

(72) Inventors: Mahesh Godavarti, Cupertino, CA (US); Sridhar Pilli, Fremont, CA (US); Biswaranjan Panigrahi, Bangalore (IN)

(73) Assignee: Nuance Communications, Inc., Burlington, MA (US)

( * ) Notice: Subject to any disclaimer, the term of this patent is extended or adjusted under 35 U.S.C. 154(b) by 62 days.

(21) Appl. No.: 14/518,622

(22) Filed: Oct. 20, 2014

(65) Prior Publication Data

US 2016/0112153 A1    Apr. 21, 2016

(51) Int. Cl.
*H04L 1/00* (2006.01)
*H04L 12/26* (2006.01)
*H04J 99/00* (2009.01)
*H04L 12/875* (2013.01)

(52) U.S. Cl.
CPC ............ *H04J 15/00* (2013.01); *H04L 47/562* (2013.01)

(58) Field of Classification Search
CPC ............. H04L 47/6215; H04L 47/2416; H04L 47/283; H04L 47/6255; H04L 12/5693; H04L 49/90; H04L 49/3027; H04L 49/3018; H04L 2012/5679; H04L 43/0852; H04L 43/087; H04L 43/0858; G10L 25/78; G10L 25/93; H04M 1/253; H04M 1/2535; H04W 74/0866; H04N 21/64322
See application file for complete search history.

(56) References Cited

U.S. PATENT DOCUMENTS

| | | | | |
|---|---|---|---|---|
| 6,009,077 A | * | 12/1999 | Firoiu | H04L 12/5695 370/230 |
| 7,349,419 B1 | * | 3/2008 | Philp | H04L 45/00 370/414 |
| 7,606,154 B1 | * | 10/2009 | Lee | H04J 3/14 370/232 |
| 2002/0031086 A1 | * | 3/2002 | Welin | G10L 25/78 370/229 |

OTHER PUBLICATIONS

Isnin. "Round Robin & Shortest Job First." Liza Asyliza. N.P., Feb. 14, 2011. Web. Aug. 10, 2016. (NPL).*

* cited by examiner

*Primary Examiner* — Marsha D. Banks Harold
*Assistant Examiner* — Elton Williams
(74) *Attorney, Agent, or Firm* — Brian J. Colandreo; Michael T. Abramson; Holland & Knight LLP

(57) ABSTRACT

The present disclosure is directed towards a method for scheduling data packets in a multi-channel packet processing environment. The method may include receiving one or more data packets associated with an incoming signal and inserting the one or more data packets into a queue. The method may further include monitoring a time delay associated with each of the one or more data packets, wherein the time delay indicates a difference between packet arrival and packet departure times. The method may also include sorting the time delay results based upon an increasing order of time delay and determining a total number of data packets associated with each of a plurality of channels. The method may also include scheduling a data packet for processing based upon, at least in part, at least one of the sorted time delay results and the total number of data packets associated with each channel.

16 Claims, 9 Drawing Sheets

SYSTEM AND METHOD FOR PACKET SCHEDULING

TECHNICAL FIELD

This disclosure relates to network processing and, more particularly, to systems and methods for optimizing packet scheduling processes.

BACKGROUND

Real-time scheduling algorithms are often used to address packet processing concerns within a particular network. Most of the research in the area of real-time scheduling has been focused on systems with hard real-time constraints. Hard real-time scheduling is necessary for real-time communications and mission critical tasks.

There are scheduling algorithms available for in-network media processing elements that receive packets as input and transmits packets as output. Media processing elements can be soft real-time because any varying delay in media packets can be compensated via a jitter buffer and does not lead to catastrophic failure of communication. The existing scheduling algorithms are sub-optimal and sometimes downright inefficient. Most scheduling algorithms based on task switching also assume that task switching carries zero overhead which is an incorrect assumption. Such schedulers are not suitable for IP (internet-protocol) to IP type processing because they will propagate the jitter from dirty input streams to other clean streams being handled by the box.

SUMMARY OF DISCLOSURE

In one implementation, a method for scheduling data packets in a multi-channel packet processing environment is provided. The method may include receiving, at a processor, one or more data packets associated with an incoming signal and inserting the one or more data packets into a queue. The method may further include monitoring a time delay associated with each of the one or more data packets, wherein the time delay indicates a difference between packet arrival and packet departure times. The method may also include sorting the time delay results based upon an increasing order of time delay and determining a total number of data packets associated with each of a plurality of channels. The method may also include scheduling a data packet for processing based upon, at least in part, at least one of the sorted time delay results and the total number of data packets associated with each channel.

One or more of the following features may be included. In some embodiments, scheduling may be based upon, at least in part, identifying a data packet that causes a minimum delay among the remaining data packets. Scheduling may be based upon, at least in part, both the sorted time delay results and the total number of data packets associated with each channel. In some embodiments, the method may include processing one data packet per time period for each of the plurality of channels. The method may further include determining if a time constraint has been met prior to processing a packet on a channel. In some embodiments, the one or more data packets may be associated with a periodic input stream. Scheduling a data packet for processing may be non-preemptive and may run on a single thread. The incoming signal may be at least one of an audio signal and a video signal.

In another implementation, a system for scheduling data packets in a multi-channel packet processing environment is provided. The system may include a computing device including one or more processors configured to receive one or more data packets associated with an incoming signal and insert the one or more data packets into a queue. The one or more processors may be further configured to monitor a time delay associated with each of the one or more data packets, wherein the time delay indicates a difference between packet arrival and packet departure times. The one or more processors may be configured to sort the time delay results based upon an increasing order of time delay and determine a total number of data packets associated with each of a plurality of channels. The one or more processors may be further configured to schedule a data packet for processing based upon, at least in part, at least one of the sorted time delay results and the total number of data packets associated with each channel.

One or more of the following features may be included. In some embodiments, scheduling may be based upon, at least in part, identifying a data packet that causes a minimum delay among the remaining data packets. Scheduling may be based upon, at least in part, both the sorted time delay results and the total number of data packets associated with each channel. In some embodiments, the one or more processors may be further configured to process one data packet per time period for each of the plurality of channels. The one or more processors may be further configured to determine if a time constraint has been met prior to processing a packet on a channel. In some embodiments, the one or more data packets may be associated with a periodic input stream. Scheduling a data packet for processing may be non-preemptive and may run on a single thread. The incoming signal may be at least one of an audio signal and a video signal.

In another implementation, a method for scheduling data packets in a multi-channel packet processing environment is provided. The method may include receiving, at a processor, one or more data packets associated with an incoming signal and inserting the one or more data packets into a queue. The method may further include monitoring a time delay associated with each of the one or more data packets, wherein the time delay indicates a difference between packet arrival and packet departure times. The method may also include sorting the time delay results based upon an increasing order of time delay and determining a total number of data packets associated with each of a plurality of channels. The method may also include scheduling a data packet for processing based upon, at least in part, at least one of the sorted time delay results and the total number of data packets associated with each channel and simultaneously processing multiple channels of the plurality of channels.

One or more of the following features may be included. In some embodiments, each of the multiple channels may include a distinct packetization interval. The received data packets may be internet protocol ("IP") data packets and the processor may be further configured to output processed output IP data packets after scheduling. The processing environment may be configured to operate in accordance with a G.711 standard.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a scheduling process 10 that may be configured to address data packet processing issues in a network. Embodiments of the present disclosure may include an optimal scheduling algorithm for in-network media processing that may allow for maximum CPU utilization and minimum delay and jitter. The scheduling process described herein may provide a non-preemptive scheduling algorithm, which may be optimal in the sense that it minimizes the average delay taken across all packets introduced in the streams while fully utilizing the available CPU resources. Existing approaches require pre-emption which requires precious CPU resources and are not designed for periodic input streams.

Embodiments of scheduling process 10 may provide an optimal scheduling algorithm that maximizes CPU usage up to 100% such that it may 1) minimize the jitter and delay introduced in individual packet streams and minimizes cross-propagation of jitter across packet streams when processing non-ideal packet stream traffic but; 2) matches the performance of the best off-line scheduling algorithms when processing ideal packet traffic that is ideal in the sense that all streams are strictly periodic; and maintain the same period and processing time throughout their existence.

Figure 1:
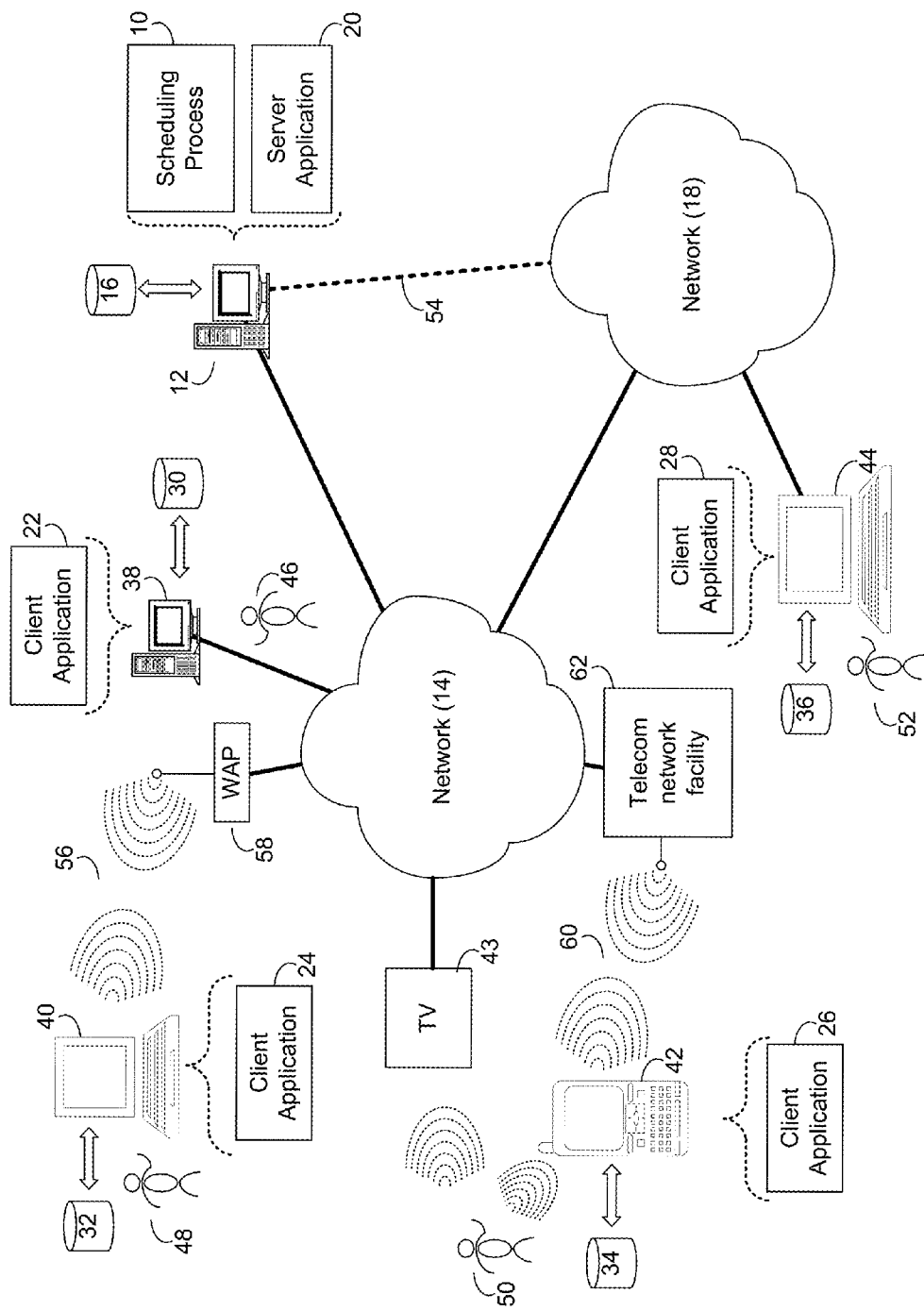
FIG. 1 is a diagrammatic view of a scheduling process in accordance with an embodiment of the present disclosure.
Figure 2:
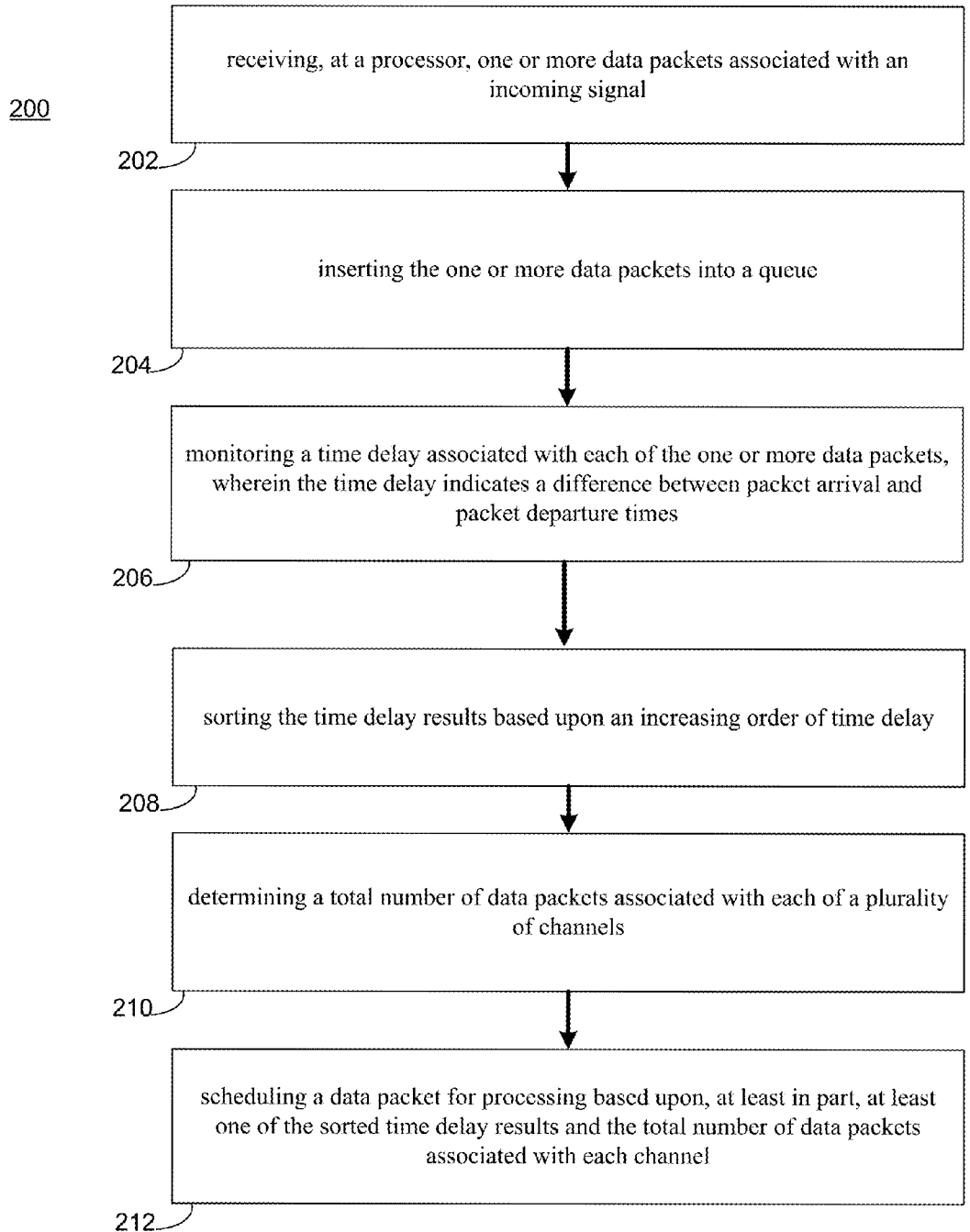
FIG. 2 is a flowchart of a scheduling process in accordance with an embodiment of the present disclosure.

Referring to FIG. 1, there is shown a scheduling process 10 that may reside on and may be executed by computer 12, which may be connected to network 14 (e.g., the Internet or a local area network). Server application 20 may include some or all of the elements of scheduling process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail below and in the Figures, scheduling process 10 may include receiving (202) one or more data packets associated with an incoming signal and inserting (204) the one or more data packets into a queue. The method may further include monitoring (206) a time delay associated with each of the one or more data packets, wherein the time delay indicates a difference between packet arrival and packet departure times. The method may also include sorting (208) the time delay results based upon an increasing order of time delay and determining (210) a total number of data packets associated with each of a plurality of channels. The method may also include scheduling (212) a data packet for processing based upon, at least in part, at least one of the sorted time delay results and the total number of data packets associated with each channel. Numerous additional features may also be included as discussed in further detail below.

The instruction sets and subroutines of scheduling process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, scheduling process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), a dedicated network device (not shown), and/or any device capable of receiving and transmitting data (e.g. audio, video, etc.).

One or more of client applications 22, 24, 26, 28 may be configured to effectuate some or all of the functionality of scheduling process 10. Accordingly, scheduling process 10 may be a purely server-side application, a purely client-side application, or a hybrid server-side/client-side application that is cooperatively executed by one or more of client applications 22, 24, 26, 28 and scheduling process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and scheduling process 10 directly through network 14 or through secondary network 18. Further, computer 12 may be connected to network 14 through secondary network 18, as illustrated with phantom link line 54. In some embodiments, users may access scheduling process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

Embodiments of the scheduling process described herein may provide an optimal scheduling algorithm for in-network media processing for maximum CPU utilization and minimum delay and jitter. Accordingly, scheduling process 10 may provide a non-preemptive scheduling algorithm in the sense that it minimizes the average delay taken across all packets introduced in the streams while fully utilizing the available CPU resources. Existing real-time algorithms require pre-emption which requires precious CPU resources and are not designed for periodic input streams for which processing may not require preemption.

Embodiments of the scheduling process described herein may be used with any suitable type of data. Some of these may include, but are not limited to, voice and video processing.

In some embodiments, and with reference to voice activity detection module 404, scheduling process 10 may use one or more voice activity detector ("VAD") algorithms. Additional information regarding VAD may be found in United States Patent Publication Number 2011/0184732 having an application Ser. No. 13/079,705, which is incorporated herein by reference in its entirety.

Figure 3:
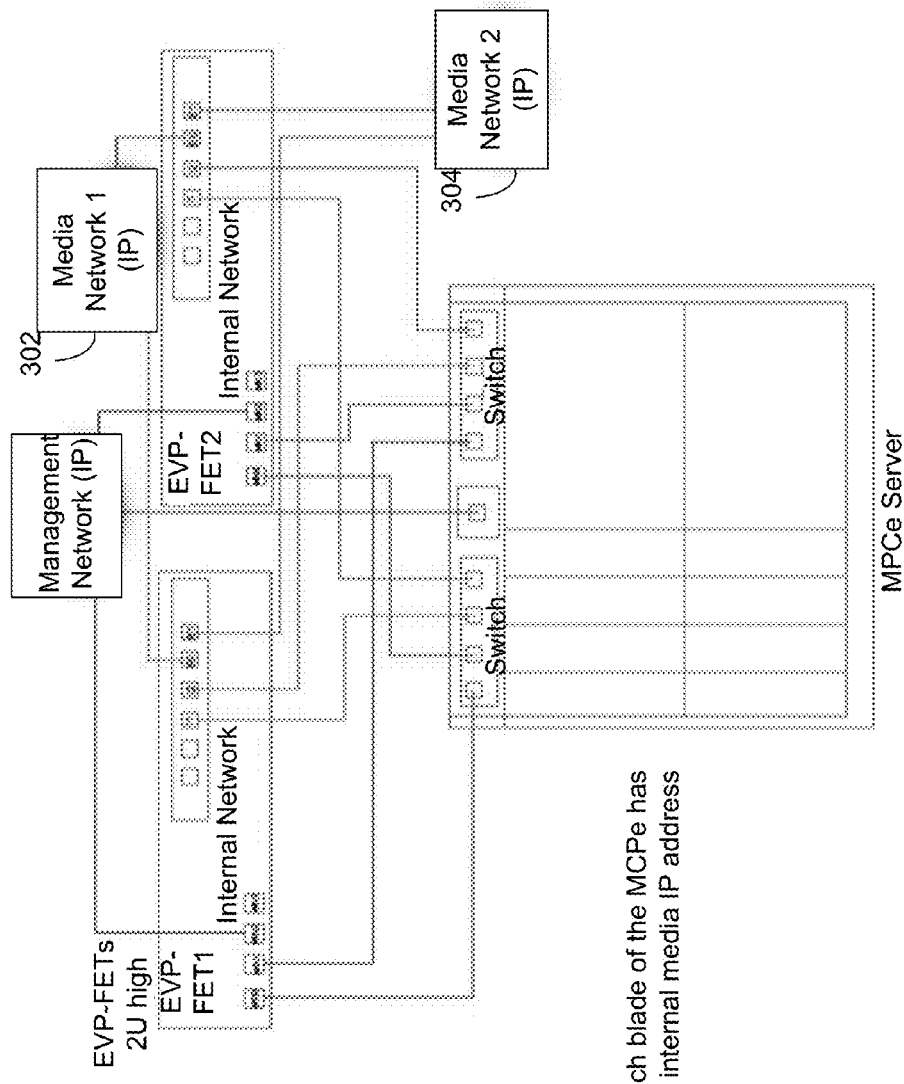
FIG. 3 is a diagrammatic view of an embodiment of a scheduling process in accordance with an embodiment of the present disclosure.
Figure 4:
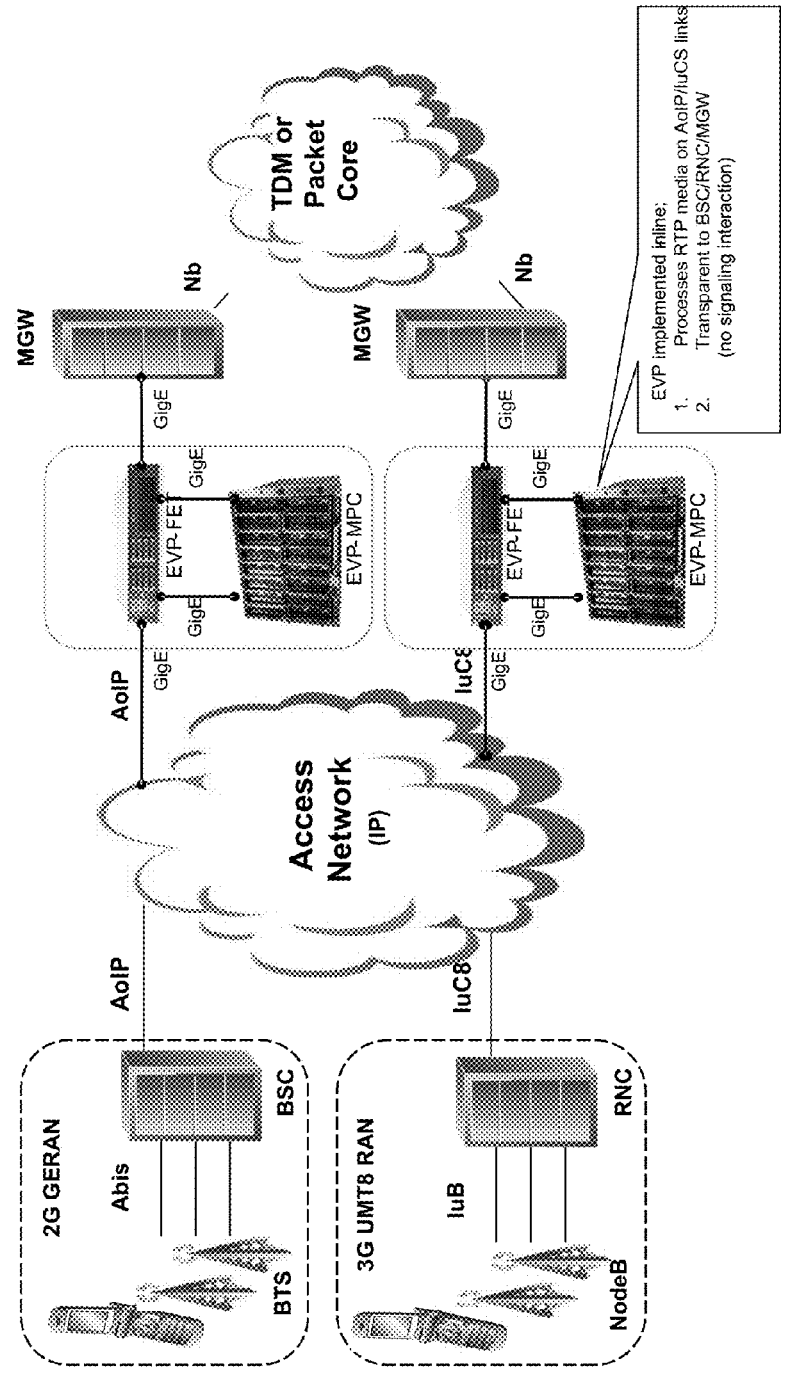
FIG. 4 is a diagrammatic view of an embodiment of a scheduling process in accordance with an embodiment of the present disclosure.

Referring now to FIGS. 3-4, embodiments depicting an Ethernet voice processor that may be used with scheduling process 10 are provided. In some embodiments, an Ethernet Voice Processor ("EVP") may refer to a dedicated Voice over Internet Protocol ("VoIP") voice processor that resides in the network and influences the payload (e.g., the voice contents of the IP packets). Some embodiments of the EVP may participate in signaling and may be invisible to the end points. Therefore, the EVP may be configured to present the output in exactly the same form as the input (e.g., Packets-in=Packets-out). In some embodiments, the EVP may focus on voice processing tasks and may process multiple channels simultaneously per CPU. Additionally and/or alternatively, since the EVP may be directed towards voice processing, there may not be any hard deadlines for the processing to be complete. When compared to other in-network media processors such as routers and switches, a media processing is generally far more intensive than packet-switching type applications. Therefore, the cost to build a hard real-time EVP may be far greater than building a hard real-time router or switch equipment. When compared to other media processors found in the network (e.g., Media Gateways) the EVP may be located in the middle of the IP network whereas the other equipment may straddle two domains (e.g., IP on one side and TDM on the other).

Figure 8:
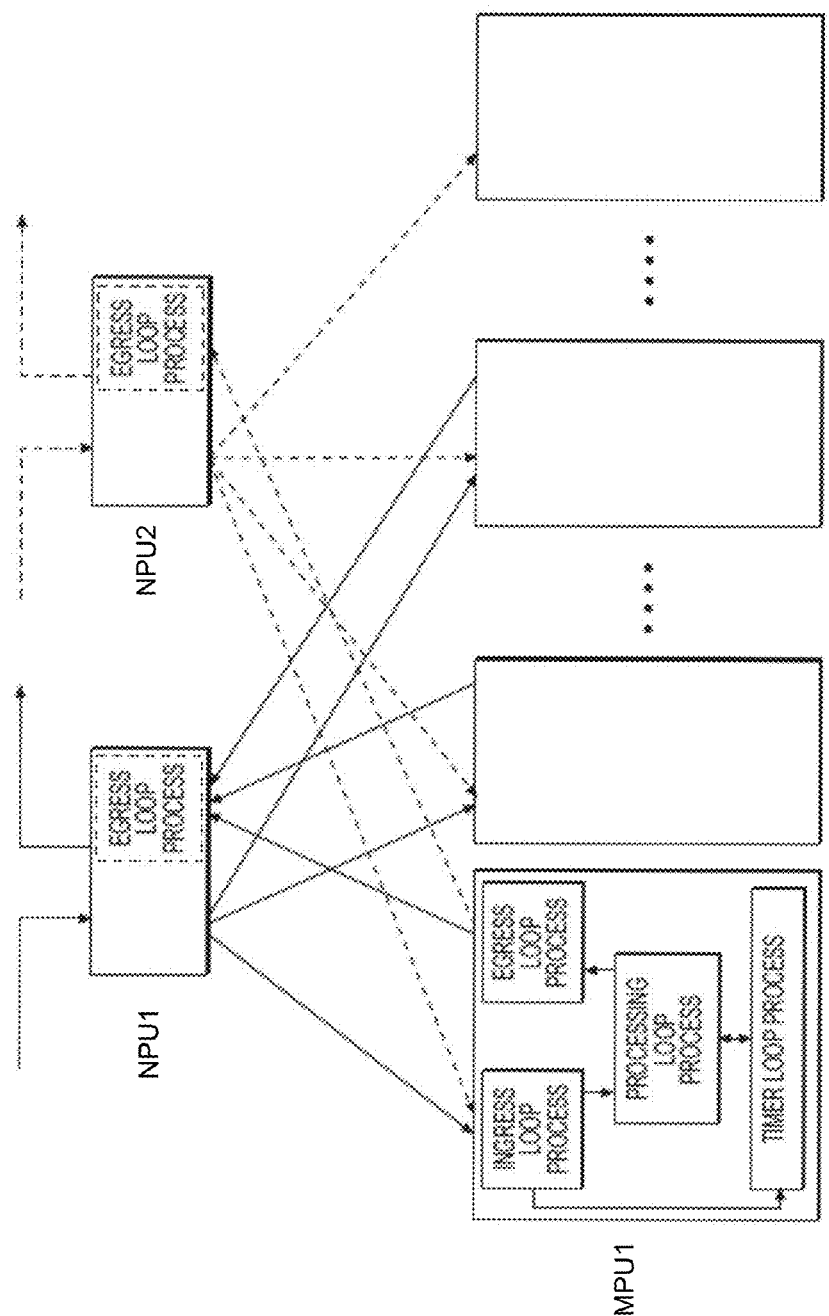
FIG. 8 is a diagrammatic view of an embodiment of a scheduling process in accordance with an embodiment of the present disclosure.

In the particular example shown in FIG. 3, multiple media networks 302, 304 are provided, which may determine how packets flow. In the deployment scenario, assume that first media network 302 as being on the left of EVP and second media network 304 as being on the right. There are two links each from first media network 302 and second media network 304 for redundancy or for possible link aggregation. Accordingly, two front end taps ("FETs") and/or network processing units ("NPUs") may be utilized. In some embodiments, NPUs may be responsible for distributing the media across different blades. An example of a media flow diagram is provided in FIG. 8. The egress process may reside either in the media processor unit or the network processor unit.

Figure 5:
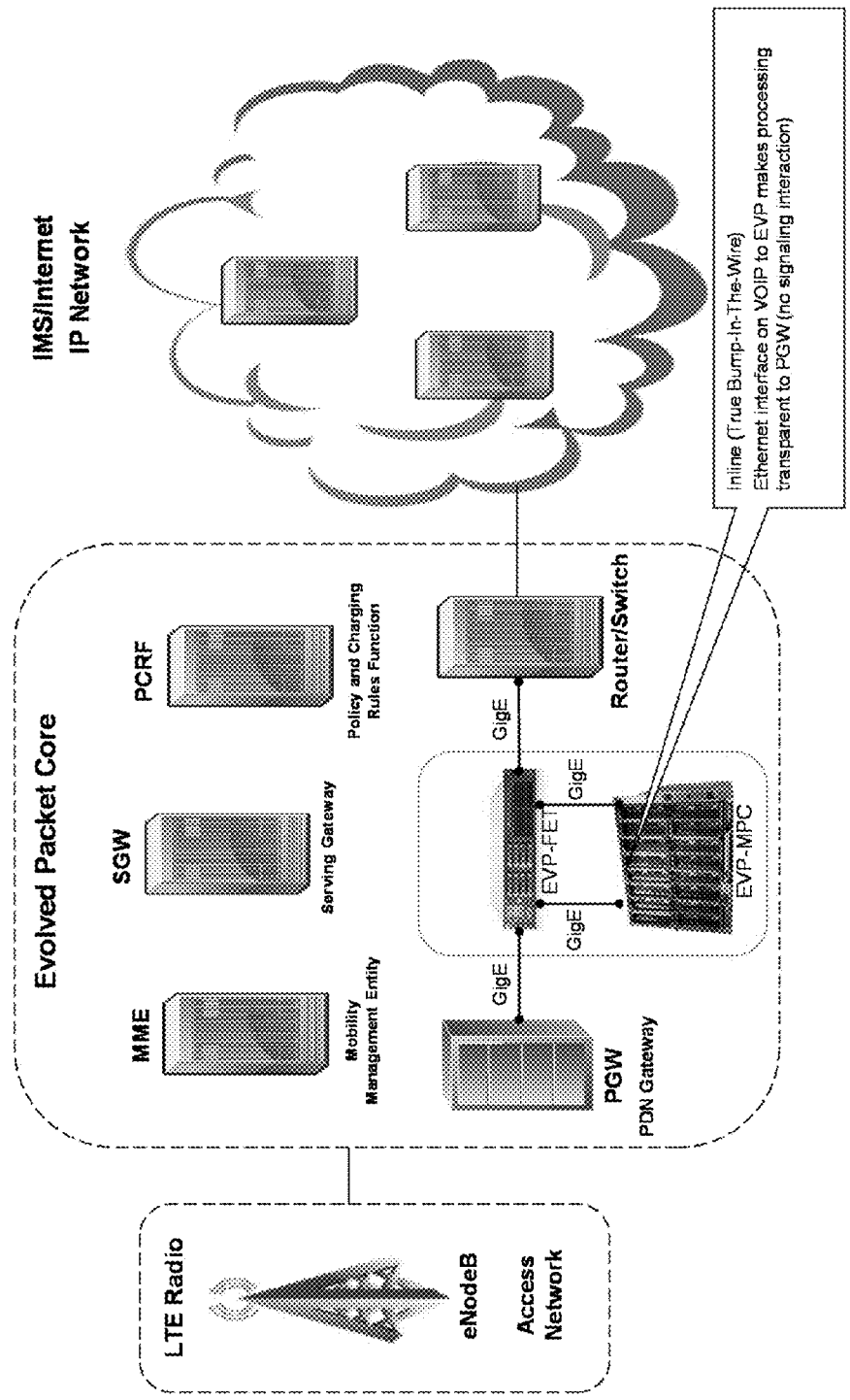
FIG. 5 is a diagrammatic view of an embodiment of a scheduling process in accordance with an embodiment of the present disclosure.

Referring also to FIGS. 4-5, embodiments of scheduling process 10 depicting 2G/3G deployment 400 and 4G/LTE deployment 500 are provided. In the 2G/3G deployment 400, the Voice Quality Assurance "VQA" features may operate on compressed speech traffic without TDM transdecoding. This configuration may also provide improved speech quality for both calling and called parties. This configuration may support "in-line" deployment on logical AoIP and IuCS links. In the 4G deployment 500, the VQA features may operate on RTP speech traffic and may provide improved speech quality for both calling and called parties. EVP "in-line" deployment may be available on local PDN gateway links.

Figure 6:
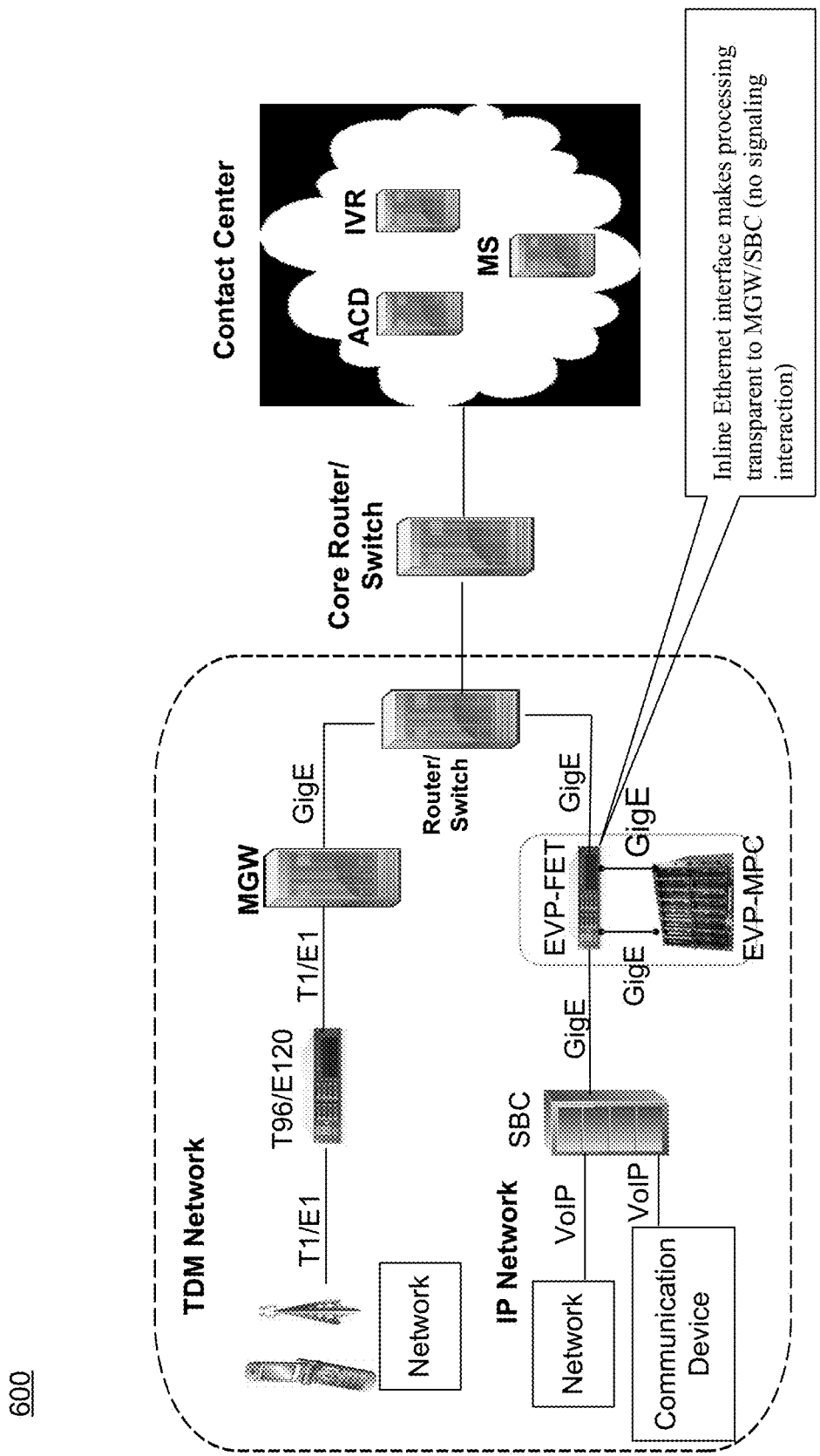
FIG. 6 is a diagrammatic view of an embodiment of a scheduling process in accordance with an embodiment of the present disclosure.

Referring also to FIG. 6, an embodiment of scheduling process 10 depicting a sample network topology 600 is provided. This particular illustration may represent a sample high level network topology for a TDM or IP implementation. Specific placement of the VQA solution may vary for various reasons, some of which may include, but are not limited to, being based on a customer contact center architecture.

In some embodiments, the EVP may be configured process all channels while reducing the amount of hardware required. As such, each CPU resource associated with the EVP may be configured to process the maximum number of channels possible. In this way, scheduling process 10 may be configured to maximize CPU resources (e.g., no idling if there is a voice packet available to be processed).

Embodiments of scheduling process 10 may involve mostly periodic tasks and those that are not hard real-time. The amount of CPU resources involved may be directly proportional to the packetization time. The packetization time may be the same, or roughly the same, as the inter-packet arrival time.

Accordingly, if M channels (or processes), each of packetization time T, are supported on the core the time dedicated to processing each channel would be T/M. It is guaranteed that every packet from every channel may be processed every time interval T. In this way, every channel gets 1/M of the CPU resources for every time interval T.

If the packetization time for each channel is completely random, the core may still be able to support M channels (or processes) but now, it is guaranteed that every packet from every channel will be processed every minimum cycle period T where T is the least common multiple of all the channel packetization/inter-arrival times (often referred to as the hyper period or the minimum cyclic period). Note that, this means that every channel gets 1/M of the CPU resources every time interval T.

In some embodiments, the EVP and scheduling process 10 may be configured to preserve CPU resources and minimize delay and jitter through the media processor. Scheduling process 10 may also be configured to handle any occasional jitter in any of the channel streams. In some cases, scheduling process 10 may not have any knowledge of channel order with regard to the arrival of packets. The scheduler may not have any knowledge of which channels will arrive in what order to be able to design an off-line scheduler.

Accordingly, embodiments of scheduling process 10 may be configured to simultaneously process multiple channels such that each stream has its own packetization interval (e.g., 20 ms G.711 vs. 30 ms G.711, etc.). Scheduling process 10 may be configured for deterministic periodic tasks (e.g., each task with its own period) with provisions to handle occasional disruptions in the periodicity. Note that the trigger times for each task could be randomly distributed with respect to each other. Scheduling process 10 may be configured for deterministic periodic tasks whose share of CPU resources may be directly proportional to the packet time which is mostly true for speech enhancement algorithms.

In some embodiments, scheduling process 10 may ensure that CPU resources are shared equally across all channels and may operate deterministically if the input stream is deterministically periodic. Scheduling process 10 may be configured to introduce minimal delay and jitter into each of the streams and ensure that misbehaving streams (e.g. incoming streams with considerable jitter and delay) do not influence the other well behaved streams. In other words, the sharing of resources does not propagate jitter and delay from one stream into others. Scheduling process 10 may not unnecessarily hold packets as it is configured to send them out as soon as it receives them. Scheduling process 10 may be designed off-line and in a static manner. That is, it may not be based on self-analysis (no effects of interaction between the incoming traffic and CPU utilization). Scheduling process 10 may be non-preemptive in nature as it may run on a single thread.

In some embodiments, scheduling process 10 may include three threads. One thread may be configured to obtain the packets and insert them into a queue that the scheduling thread may pick up for processing. The second thread may be configured to monitor the time that tells the scheduler exactly how to pace the processing. The third thread may be configured to perform scheduling and media processing operations.

In some embodiments, scheduling process 10 may include four threads. One thread may be configured to obtain the packets and insert them into a queue that the scheduling thread may pick up for processing. The second thread may be configured to monitor the time that tells the scheduler exactly how to pace the processing. The third thread may be configured to perform scheduling and media processing operations. The fourth thread may be configured to perform egress scheduling of processed packets to ensure minimal jitter at EVP output.

In some embodiments, scheduling process 10 may be configured to process those packets first that cause minimum delay in other packets. Accordingly, scheduling process 10 may not continue processing packets from the same channel and allocate too much of the CPU resources to that channel as it may starve the other channels from having access to the resources. If one channel has many pending packets to be processed then scheduling process 10 may provide an extra share of the CPU resources to that channel if the resources are available. CPU resources are available if the CPU is idle.

In some embodiments, scheduling process 10 may include an input thread, which may provide the packets to the scheduler for processing. One example of an input thread is provided below.

```
While (1)
{
    If (new_packet)
    {
        If (new_packet from new_channel)
        {
            insert_into_sorted_channel_list( ) // sorted by increasing packet times
            NUM_CHANNELS = NUM_CHANNELS + 1
                    Processed_time(channel_num) = packet_time(channel_num) // Initialize
processed_time variable to packetization time for that chanel
                    Egress_time(channel_num) = packet_time(channel_num) // Initialize processed
time variable to zero
        }
        Channel_num = get_channel_num_from_sorted_list( )
        // NEEDED BECAUSE OF DISCONTINOUS TRANSMISSION
        If (SID_TO_SPEECH OR DTX_TO_SPEECH)
        {
            Processed_time(channel_num) = packet_time(channel_num)
            Egress_time(channel_num) = packet_time(channel_num)
        }
        Insert_queue(new_packet, channel_num)
                    Num_packets_available_for_processing(channel_num) =
num_packets_available_for_processing(channel_num) + 1
                                                                                }
}
```

In some embodiments, scheduling process 10 may include a time update thread, which may monitor the passage of time. One example of a time update thread is provided below.

```
While(1)
{
    For channel_num = 1 to NUM_CHANNELS
    {
        Processed_time(channel_num) =
        processed_time(channel_num) + tick_interval
        Egress_time(channel_num) =
        egress_time(channel_num) + tick_interval
    }
}
```

In some embodiments, scheduling process 10 may include a processing thread, one example of a processing thread is provided below:

```
Processing_loop:
// cycle through all channels
        // sorted by increasing order of packet time
For channel_num = 1 to NUM_CHANNELS
{
    // check further if it is too soon to process a packet on this channel
        // The check ensures that bursty channels do not hog the CPU
        // Process on average one packet per time period for every channel
    If (processed_time(channel_num) >= packet_time(channel_num))
        {
        // check if any packets available to process
         If (num_packets_available_for_processing(channel_num) >= 1)
         {
                    Processed_time(channel_num) = processed_time(channel_num) − packet_time(channel_num)
// Set the delay in the egress process according to the most delayed packet in the processing chain
            If (egress_time(channel_num) > packet_time(channel_num))
                Egress_time(channel_num) = packet_time(channel_num)
            // packet is available - let's process
            process_packet(channel_num)
                    // decrement the number of packets still to be processed by 1
                        num_packets_available_for_processing(channel_num)    = num_packets_available_for_processing(channel_num) − 1
                // increment the number of packets available to be sent out by 1
                Num_packets_available_for_egress(channel_num)    = num_packets_available_for_egress(channel_num) + 1
                // continue processing the rest of the channels by restarting the loop
                channel_num = 1    // restart the loop
                continue   // restart the loop
           }
        }
}
// If here means all channels have been serviced per their rate
// CPU is idle, check if any other packets available
Second_loop:
For channel_num = 1 to NUM_CHANNELS
{
        // check if any packets available to process
        if (num_packets_available_for_processing(channel_num) >= 1)
                {
                Processed_time(channel_num) = processed_time(channel_num) − packet_time(channel_num)
            // packet is available - let's process
            process_packet(channel_num)
                    // decrement the number of packets still to be processed by 1
                        num_packets_available_for_processing(channel_num)    = num_packets_available_for_processing(channel_num) − 1
                // increment the number of packets available to be sent out by 1
                Num_packets_available_for_egress(channel_num)    = num_packets_available_for_egress(channel_num) + 1
                // processed a packet - go back to the main loop to check if any channels need to be serviced
            Break
        }
}
Go_to Processing_loop:
```

In some embodiments, scheduling process 10 may also include an egress thread designed to reduce jitter at the output of the EVP by introducing just enough delay in the stream of a channel so that packets are available at egress at the end of every packetization time interval.

Figure 7:
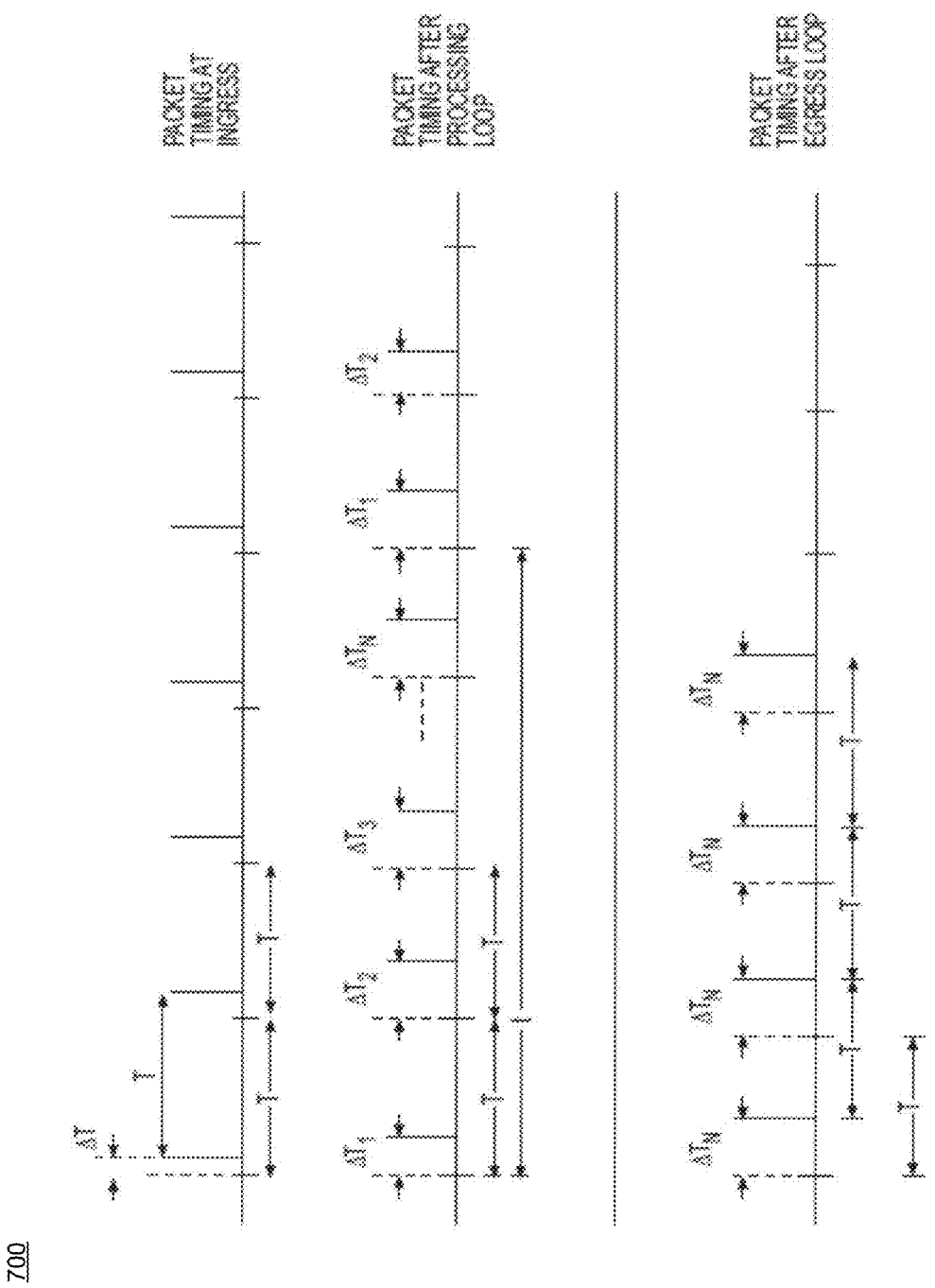
FIG. 7 is a diagrammatic view of an embodiment of a scheduling process in accordance with an embodiment of the present disclosure.

In some embodiments, this loop may reside on the media processing unit ("MPU") or the network processing unit ("NPU"). FIG. 7 depicts an example of a timing diagram corresponding to a 100% loaded processor having different periodicities on each channel (e.g., MPU).

One example of an egress thread is provided below:

```
egress_loop:
// cycle through all channels
            // sorted by increasing order of packet time
For channel_num = 1 to NUM_CHANNELS
{
    // check further if it is too soon to send out a packet on this channel
If (egress_time(channel_num) >= packet_time(channel_num))
        {
        // check if any packets available to process
           If (num_packets_available_for_egress(channel_num) >= 1)
            {
                    egress_time(channel_num) = egress_time(channel_num) –
packet_time(channel_num)
            // packet is available for egress - let's send it out
               egress_packet(channel_num)
                    // decrement the number of packets still to be sent out by 1
                        num_packets_available_for_egress(channel_num) =
num_packets_available_for_egress(channel_num) – 1
            // continue processing the rest of the channels by restarting the loop
               channel_num = 1    // restart the loop
               continue   // restart the loop
            }
        }
}
// If here means all channels have been sent out per their rate
// check if any other packets available
Second_loop:
For channel_num = 1 to NUM_CHANNELS
{
        // check if any packets available to be sent out
        if (num_packets_available_for_egress(channel_num) >= 1)
            {
                    egress_time(channel_num) = egress_time(channel_num) –
packet_time(channel_num)
            // packet is available - let's send it out
               egress_packet(channel_num)
                    // decrement the number of packets still to be sent out by 1
                        num_packets_available_for_egress(channel_num) =
num_packets_available_for_egress(channel_num) – 1
            // a packet has been sent out - go back to the main loop to check if any
channels need to be serviced
               Break
            }
}
Go_to egress_loop:
```

It is assumed that the variables being accessed across multiple processes have mutexes and locks in place so that the multiple processes are not trying to access the same variable at exactly the same time.

In some embodiments, scheduling process 10 may exploit the fact that in voice processing some of the frames are noise (so can be discarded with minimal impact on quality) to catch the departure time up with the arriving time. In this way, scheduling process 10 may exploit any idle time available to catch the packets up.

Assuming the proportion of CPU occupied is directly proportional to the packet-time, if the packets arrive at exactly the packet time boundaries (e.g., 30 ms frames arrive every 30 ms, 20 ms frames arrive every 20 ms, etc.) the output jitter may be zero (provided all the packet times are exactly the same) and the delay introduced is the minimum possible while the CPU is utilized 100%.

In some embodiments, the upper bound on the delay introduced may be the maximum packet-time being processed by the thread. Accordingly, if there are multiple CPUs available in the system the channels should be allocated intelligently such that the ratio of the maximum packet time to minimum packet time is as small as possible. For example, if a system is processing 4 channels with 10, 20, 30 and 60 ms packet times and there are 2 CPUs available, then 10 and 20 ms packet times should be allocated to CPU 1 and 30 and 60 ms packet times should be allocated to CPU2. Numerous other configurations are also within the scope of the present disclosure.

In some embodiments, scheduling process 10 may utilize a shortest job first (SJF) scheduling decision at every stage. The algorithm is known to give the lowest average delay over a short finite bursts of tasks. However, the proofs of optimality rest on the assumptions that all the tasks arrive for processing at the same time, which is rarely true.

In some embodiments, if the incoming channels are guaranteed to be periodic then the scheduling process 10 may behave the same as static cyclic scheduling. That is, even if the channel order is known and an optimal scheduling algorithm is designed it will not do any better than scheduling process 10 provided the CPU utilization is 100%.

In some embodiments, scheduling process 10 may provide the minimum average delay (and even minimum average fractional delay) for a group of periodic tasks with an upper bound on the worst case delay among all channels being processed. The proof of optimality assumes that CPU is loaded 100%.

Accordingly, it should be noted that for an input sequence where every packet on every channel arrives at the deterministic inter-packet arrival time for that channel then scheduling process 10 may itself become deterministic with a repeating cyclic pattern. The cycle of repetition may be the same as the minimum cyclic period where the input sequence pattern across all channels repeats itself. The hyper-period may be the least common multiple of all inter-packet arrival times across all channels.

Then, to consider the average a calculation of the average delay over all packets across all channels in a hyper-period (or the minimum cyclic period) over which the pattern of arrivals and departures repeat may be performed.

Therefore, $$\text{Average Delay} = \frac{1}{N} \sum_{i=1}^{N} [t_{out}(i) - t_{in}(i)]$$

$$\text{Average Fractional Delay} = \frac{1}{N} \sum_{i=1}^{N} \frac{[t_{out}(i) - t_{in}(i)]}{t_p(i)}$$

Where N is the total number of packets received in a hyper-period across all channels. $t_p(i)$ is the inter-packet arrival time associated with that particular packet.

Note that the number of channels supported is M (not N). Now, note that $$\text{Average Delay} = \frac{1}{N} \sum_{i=1}^{N} t_{out}(i) - \frac{1}{N} \sum_{i=1}^{N} t_{in}(i)$$

Therefore, Average Delay becomes:

$$\text{Average Delay} = \frac{1}{N} \sum_{i=1}^{N} [t_{out}(i-1) + \alpha t_p(i)] - \frac{1}{N} \sum_{i=1}^{N} t_{in}(i)$$

Where $t_{out}(0) = T_{start}$ is the start of the hyper-period and $\alpha t_p(i)$ would be the amount of time taken to process the $i_{th}$ packet. Therefore, $$\text{Average Delay} = \frac{1}{N} \sum_{i=1}^{N} [(N - 1 + i) \cdot \alpha \cdot t_p(i)] + C$$

Where C is simply a constant.

This means that $\alpha t_p(i)$ with the biggest coefficients need to be as small as possible. That is, the earlier packet times need to be smaller than latter packet times. Accordingly, every time a packet is done processing the next packet that needs to be scheduled is the smallest one available.

Max-delay is upper bound by $\alpha t_p(max)$.

In some embodiments, scheduling may be based upon, at least in part, identifying a data packet that takes the minimum amount of time for processing and thus causes a minimum delay among the remaining data packets. Scheduling may be based upon, at least in part, both the sorted time delay results and the total number of data packets associated with each channel. In some embodiments, the method may include processing one data packet per time period for each of the plurality of channels. The method may further include determining if a time constraint has been met prior to processing a packet on a channel. In some embodiments, the one or more data packets may be associated with a periodic input stream. Scheduling a data packet for processing may be non-preemptive and may run on a single thread. The incoming signal may be at least one of an audio signal and a video signal.

In another implementation, a system for scheduling data packets in a multi-channel packet processing environment is provided. The system may include a computing device including one or more processors configured to receive one or more data packets associated with an incoming signal and insert the one or more data packets into a queue. The one or more processors may be further configured to monitor a time delay and processing time associated with each of the one or more data packets, wherein the time delay indicates a difference between packet arrival and packet departure times and processing time indicates the amount of time taken to processing the packet. The one or more processors may be configured to sort the time delay results based upon an increasing order of time delay, sort the processing time results based upon an increasing order of processing time and determine a total number of data packets associated with each of a plurality of channels. The one or more processors may be further configured to schedule a data packet for processing based upon, at least in part, at least one of the sorted time delay results, sorted processing time results and the total number of data packets associated with each channel.

One or more of the following features may be included. In some embodiments, scheduling may be based upon, at least in part, identifying a data packet that takes the minimum amount of time for processing and thus causes a minimum delay among the remaining data packets. Scheduling may be based upon, at least in part, both the sorted time delay results and the total number of data packets associated with each channel. In some embodiments, the one or more processors may be further configured to process one data packet per time period for each of the plurality of channels. The one or more processors may be further configured to determine if a time constraint has been met prior to processing a packet on a channel. In some embodiments, the one or more data packets may be associated with a periodic input stream. Scheduling a data packet for processing may be non-preemptive and may run on a single thread. The incoming signal may be at least one of an audio signal and a video signal.

In some embodiments, scheduling process 10 may include receiving one or more data packets associated with an incoming signal and inserting the one or more data packets into a queue. The method may further include monitoring a time delay and processing time associated with each of the one or more data packets, wherein the time delay indicates a difference between packet arrival and packet departure times and processing time indicates the amount of time taken to process the packet. The method may also include sorting the time delay results based upon an increasing order of time delay and the processing time results based upon an increasing order of processing time and determining a total number of data packets associated with each of a plurality of channels. The method may also include scheduling a data packet for processing based upon, at least in part, at least one of the sorted time delay results, sorted processing time results and the total number of data packets associated with each channel.

Figure 9:
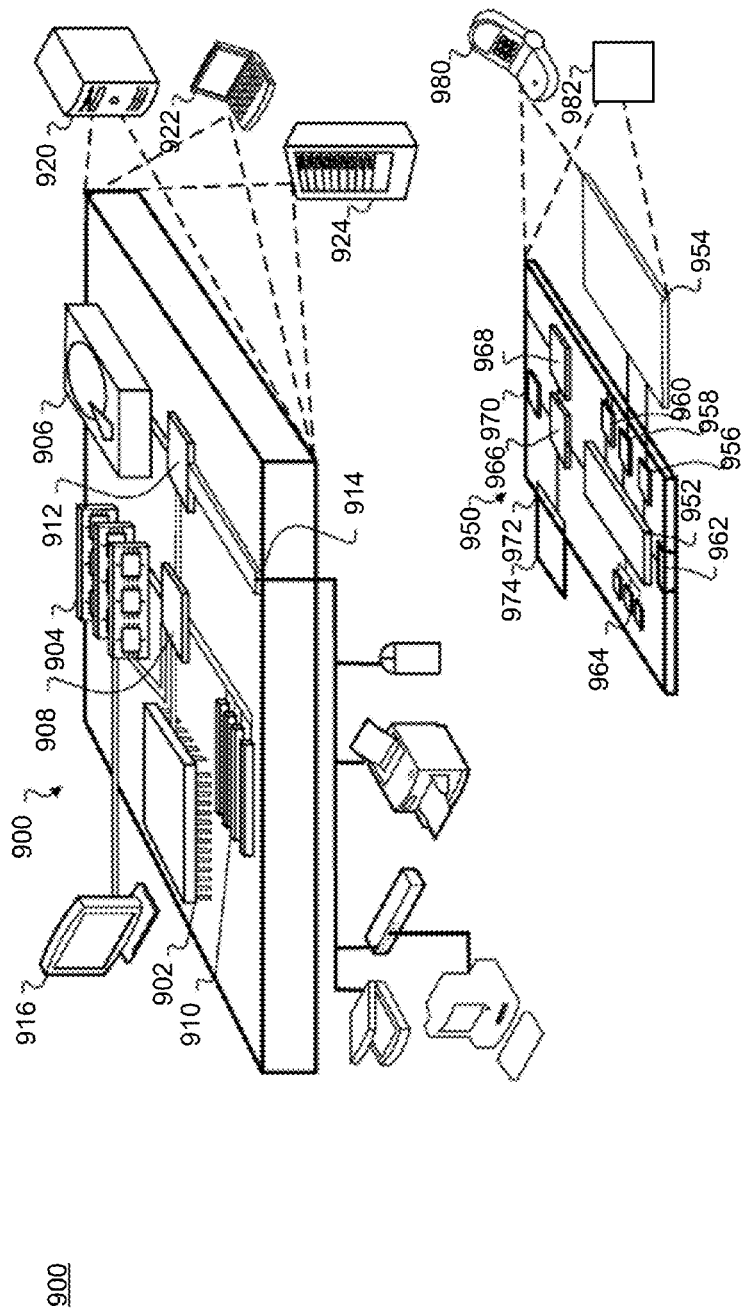
FIG. 9 shows an example of a computer device and a mobile computer device that can be used to implement embodiments of the present disclosure.

Referring now to FIG. 9, an example of a generic computer device 900 and a generic mobile computer device 950, which may be used with the techniques described herein is provided. Computing device 900 is intended to represent various forms of digital computers, such as tablet computers, laptops, desktops, workstations, personal digital assistants, servers, blade servers, mainframes, and other appropriate computers. In some embodiments, computing device 950 can include various forms of mobile devices, such as personal digital assistants, cellular telephones, smartphones, and other similar computing devices. Computing device 950 and/or computing device 900 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 900 may include processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, may be interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

Memory 904 may store information within the computing device 900. In one implementation, the memory 904 may be a volatile memory unit or units. In another implementation, the memory 904 may be a non-volatile memory unit or units. The memory 904 may also be another form of computer-readable medium, such as a magnetic or optical disk.

Storage device 906 may be capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

High speed controller 908 may manage bandwidth-intensive operations for the computing device 900, while the low speed controller 912 may manage lower bandwidth-intensive operations. Such allocation of functions is exemplary only. In one implementation, the high-speed controller 908 may be coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 may include a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, may be interconnected using various buses, and several of the components may be mounted on a common motherboard or in other manners as appropriate.

Processor 952 may execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

In some embodiments, processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

In some embodiments, memory 964 may store information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

Computing device 950 may be implemented in a number of different forms, as shown in the figure. For example, it may be implemented as a cellular telephone 980. It may also be implemented as part of a smartphone 982, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for non-preemptive scheduling of data packets in a multi-channel packet processing environment comprising:
   receiving, at a processor, one or more data packets associated with an incoming signal, wherein the one or more data packets are associated with a periodic input stream;
   inserting, via a first input thread, the one or more data packets into a queue;
   monitoring, via a time update thread, a time delay associated with each of the one or more data packets, wherein the time delay indicates a difference between packet arrival and packet departure times;

sorting the time delay results based upon an increasing order of time delay;

determining a total number of data packets associated with each of a plurality of channels; and scheduling, via a processing thread, a data packet for processing based upon, at least in part, at least one of the sorted time delay results and the total number of data packets associated with each channel, wherein scheduling includes performing a shortest job first ("SJF") scheduling decision, wherein scheduling is based upon, at least in part, identifying a data packet that requires a minimum amount of time to process and that causes a minimum delay among the remaining data packets.

2. The method of claim 1, wherein scheduling is based upon, at least in part, both the sorted time delay results and the total number of data packets associated with each channel.

3. The method of claim 1, further comprising:
processing one data packet per time period for each of the plurality of channels.

4. The method of claim 1, further comprising:
determining if a time constraint has been met prior to processing a packet on a channel.

5. The method of claim 1, wherein scheduling a data packet for processing is non-preemptive and runs on a single thread.

6. The method of claim 1, wherein the incoming signal is at least one of an audio signal and a video signal.

7. A system for non-preemptive scheduling of data packets in a multi-channel packet processing environment comprising:

a computing device including one or more processors configured to receive one or more data packets associated with an incoming signal, wherein the one or more data packets are associated with a periodic input stream, the one or more processors further configured to insert, via a first input thread, the one or more data packets into a queue, the one or more processors further configured to monitor, via a time update thread, a time delay associated with each of the one or more data packets, wherein the time delay indicates a difference between packet arrival and packet departure times, the one or more processors configured to sort the time delay results based upon an increasing order of time delay and determine a total number of data packets associated with each of a plurality of channels, the one or more processors further configured to schedule, via a processing thread, a data packet for processing based upon, at least in part, at least one of the sorted time delay results and the total number of data packets associated with each channel, wherein scheduling includes performing a shortest job first ("SJF") scheduling decision, wherein scheduling is based upon, at least in part, identifying a data packet that requires a minimum amount of time to process and that causes a minimum delay among the remaining data packets.

8. The system of claim 7, wherein scheduling is based upon, at least in part, both the sorted time delay results and the total number of data packets associated with each channel.

9. The system of claim 7, further comprising:
processing one data packet per time period for each of the plurality of channels.

10. The system of claim 7, further comprising:
determining if a time constraint has been met prior to processing a packet on a channel.

11. The system of claim 7, wherein scheduling a data packet for processing is non-preemptive and runs on a single thread.

12. The system of claim 7, wherein the incoming signal is at least one of an audio signal and a video signal.

13. A method for non-preemptive scheduling of data packets in a multi-channel packet processing environment comprising:

receiving, at a processor, one or more data packets associated with an incoming signal, wherein the one or more data packets are associated with a periodic input stream;

inserting, via a first input thread, the one or more data packets into a queue;

monitoring, via a time update thread, a time delay associated with each of the one or more data packets, wherein the time delay indicates a difference between packet arrival and packet departure times;

sorting the time delay results based upon an increasing order of time delay;

determining a total number of data packets associated with each of a plurality of channels;

scheduling, via a processing thread, a data packet for processing based upon, at least in part, at least one of the sorted time delay results and the total number of data packets associated with each channel, wherein scheduling includes performing a shortest job first ("SJF") scheduling decision, wherein scheduling is based upon, at least in part, identifying a data packet that requires a minimum amount of time to process and that causes a minimum delay among the remaining data packets; and simultaneously processing multiple channels of the plurality of channels.

14. The method of claim 13, wherein each of the multiple channels includes a distinct packetization interval.

15. The method of claim 13, wherein the received data packets are internet protocol ("IP") data packets and the processor is further configured to output processed output IP data packets after scheduling.

16. The method of claim 13, wherein the processing environment is configured to operate in accordance with a G.711 standard.

* * * * *